April 15, 1969  S. M. COHEN ET AL  3,438,845
LAMINATES OF STYRENE POLYMERS AND BLOCK COPOLYMERS
Filed Nov. 20, 1967
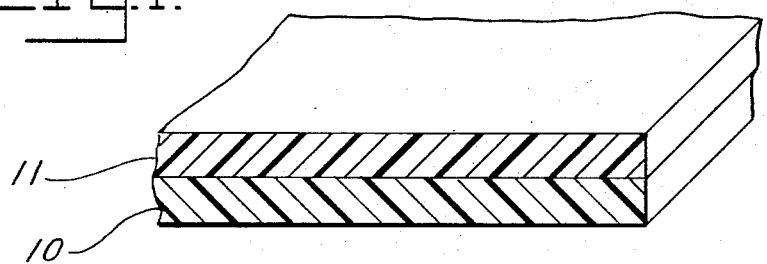
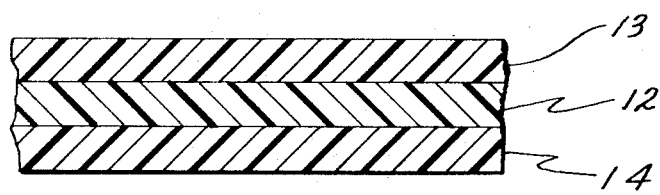
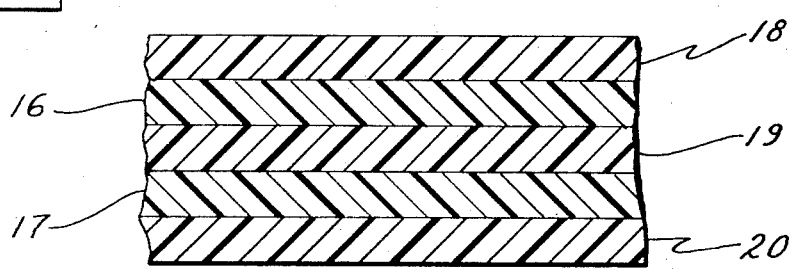
INVENTORS
MARSHALL J. DERBY
SAUL M. COHEN
BY John W. Klooster
ATTORNEY

United States Patent Office

3,438,845
Patented Apr. 15, 1969

3,438,845
LAMINATES OF STYRENE POLYMERS AND BLOCK COPOLYMERS
Saul M. Cohen, Springfield, and Marshall J. Derby, Littleton, Mass., assignors to Monsanto Company, St. Louis, Mo., a corporation of Delaware
Filed Nov. 20, 1967, Ser. No. 684,413
Int. Cl. B32b 27/08, 27/30, 31/04
U.S. Cl. 161—165                                    8 Claims

ABSTRACT OF THE DISCLOSURE

Transparent shatter-resistant plastic laminate structures employing alternate mutually bonded layers of sheets composed of styrene or styrene/acrylonitrile polymers and sheets composed of butadiene/styrene block copolymers.

BACKGROUND

Transparent, shatter-resistant laminates of the type wherein at least one transparent, rigid brittle, shatterable sheet member having low impact strength is bonded to a transparent, flexible, yielding, shock absorbing sheet member having high impact strength are generally believed by those skilled in the art to owe their shatter-resistant properties to the fact that a flexible sheet in the laminate absorbs and disperses the deformation stresses produced in the rigid sheet(s) by impact. Thus, when a crack forms (as through a shattering impact) in such a rigid sheet member, the crack is not propagated readily through such a flexible sheet member. Impact performance also benefits from a mechanism whereby, at the crack situs and within an interval of time of the order of thousandths of a second, delamination occurs between such a rigid sheet member and such a flexible sheet member. This partial, selective delamination releases, in effect, a relatively large amount of such flexible sheet member and enables it to absorb excess impact energy associated with a shattering force and thus prevent or resist penetration or propagation of crack(s) through the laminate.

Heretofore, in the art of transparent, shatter-resistant laminate structures, only laminated safety glass has enjoyed substantial commercial acceptance. Safety glass, as those skilled in the art appreciate, is composed of two sheets of an inorganic glass bonded to one another by an interlayer of organic resinous material, particularly plasticized polyvinyl butyral.

All organic, transparent, shatter-resistant laminates are unusual, probably owing both to the difficulties of obtaining appropriate yielding bond adhesion characteristics between a rigid organic sheet member and a flexible organic sheet member, and to the difficulties of obtaining appropriate light transparency characteristics in the finished laminate (especially as regards the flexible organic sheet member). For example, transparent plastic sheeting formed of either polystyrene or of poly(styrene-co-acrylonitrile) is well known for rigid, brittle, shatterable low impact strength characteristics, but so far as we are aware, no one has heretofore made transparent, shatter-resistant laminate structures using such plastic sheeting. Observe that plasticized interlayers, such as plasticized polyvinyl butyral, should be avoided in these all-organic laminates because of the tendency for solvent attack by the plasticizer on the styrene or the styrene/acrylonitrile polymer sheets.

We have now discovered all-organic, transparent, shatter-resistant laminates composed of sheets of rigid styrene or styrene/acrylonitrile polymers and sheets of (unplasticized) elastomeric butadiene/styrene block copolymers. Surprisingly, in addition to their transparency and impact properties, these laminates are thermoformable. Because of their all-organic character, their inherent low density, and their thermoformability, laminates of this invention are believed to have properties heretofore unknown to the art of transparent, shatter-resistant laminates.

DESCRIPTION OF THE DRAWINGS

The laminate structures of the present invention are illustrated by references to the attached drawings wherein:

FIGURE 1 is a diagrammatic, greatly enlarged vertical sectional view of an embodiment of the invention in its simplest form comprising a sheet 10 of butadiene/styrene polymer(s) bonded on one face thereof with an adjoining sheet 11 of styrene or styrene/acrylonitrile polymer(s).

FIGURE 2 is a view similar to FIGURE 1 but showing an alternative embodiment of the invention in a preferred form comprising a sheet 12 of butadiene/styrene polymer(s) having bonded to each opposed face thereof sheets 13 and 14 of styrene or styrene/acrylonitrile polymer(s).

FIGURE 3 is a view similar to FIGURE 1 but showing another alternative embodiment of the invention employing two sheets 16 and 17 of butadiene/styrene polymer(s) and three sheets 18, 19 and 20 of either styrene or styrene/acrylonitrile polymer(s) or combinations thereof. In this embodiment, observe that sheet 19 is bonded on each of its faces to sheets 16 and 17, respectively, of butadiene/styrene polymer(s). Laminates of the invention comprising as many alternate layers of interposed butadiene/styrene polymer sheets with sheets of either polystyrene or poly(styrene-co-acrylonitrile) can be prepared as desired. In this way, tough, and rigid transparent structures displaying good impact performance can be produced.

SUMMARY OF THE INVENTION

Briefly, this invention relates to organic, transparent, shatter-resistant, thermoformable laminates in which there are at least two different sheets of plastic material each bonded to the other. One sheet is composed of a first plastic transparent material selected from the class consisting of polystyrene and copolymers of styrene and acrylonitrile. The other sheet is composed of a second elastomeric transparent material which is composed of a block copolymer of butadiene and styrene. The styrene or acrylonitrile/styrene polymer sheets, and the butadiene/styrene polymer sheets, are stacked together one to the other in deck fashion so that a butadiene/styrene polymer sheet is always adjacent to either a styrene or a styrene/acrylonitrile polymer sheet. The face of each butadiene/styrene polymer sheet is directly and continuously bonded to the face which is adjacent thereto of a styrene polymer sheet (or of a styrene/acrylonitrile polymer sheet, as the case may be). In a given laminate of the present invention, there is always at least one butadiene/styrene polymer sheet and at least one polystyrene or poly(styrene-co-acrylonitrile) sheet.

Preferred laminates of the present invention are those wherein the elastomeric butadiene/styrene polymer sheet forms an interlayer between a pair of styrene polymer sheets or styrene/acrylonitrile polymer sheets or combinations of styrene polymer and styrene/acrylonitrile polymer sheets. Typical laminates of the present invention employ one butadiene/styrene polymer interlayer between two sheets of either polystyrene or poly(styrene-co-acrylonitrile).

For purposes of this invention, transparency is measured spectrophotometrically, and the term "transparent" or "transparency" has reference to at least 40 percent light transmission, preferably to at least 70 percent light transmission, and still more preferably to at least 85 percent light transmission, as measured through a pair of dissimilar sheets bonded together in face-to-face engagement in accordance with the teachings of this invention, one sheet being the butadiene/styrene polymer, the other being the styrene or styrene/acrylonitrile polymer.

Similarly, for purposes of this invention, shatter-resistance may be measured in terms of impact resistance using a conventional type falling dart with a ¾-inch metal nose and a laminate clamping bar with specimen hole of 2 inches diameter. Impact energy is calculated as a product of the height and weight of the dart required to penetrate the laminate. The term "shatter-resistance" or "shatter-resistant" has reference to substantial prevention of penetration through the laminate layers and simultaneous substantial elimination of flying pieces of material from the laminate after impact, as measured with (through) two sheets of either polystyrene or poly(styrene-co-acrylonitrile), or combination thereof, which are continuously initially bonded together over opposing faces through a sheet of block poly(butadiene-co-styrene).

Similarly, for purposes of this invention, thermoformability is measured in terms of capacity of a laminate of this invention to be formed into a three-dimensional predetermined shape from a flat sheet form under the influence of appropriate heat and pressure without destroying the integrity (i.e. the continuity) of sheets or layers comprising the laminate composite. The term "thermoformability" or "thermoformable" has reference to the conventional thermoforming conditions used for styrene or styrene-acrylonitrile polymer which are typically carried out using temperatures ranging from about 140–205° C. while employing either subatmospheric pressures ranging from about 25–29 inches gauge or superatmospheric pressures of from about 15 to 100 p.s.i. Heating times of up to about three minutes are used. All measurements are conveniently made through at least a pair of dissimilar sheets bonded together in face-to-face engagement in accordance with the teachings of this invention, one sheet being the butadiene/styrene polymer, the other being the styrene or styrene/acrylonitrile polymer.

The butadiene/styrene copolymer used in the present invention is a copolymer containing from about 13–39 weight percent styrene and from about 61–87 weight percent butadiene, although somewhat larger (or, correspondingly, smaller) amounts of each can be employed without departing from the spirit and scope of the invention. Furthermore, the styrene/butadiene copolymer used in this invention is what is known to those skilled in the art as a block copolymer in which each molecule has a center portion composed of polybutadiene and peripheral or terminal portions composed of polystyrene. The central portion of each molecule preferably has a molecular weight of at least about 6000 and each polystyrene terminal portion of each molecule has a molecular weight of at least about 2000. Typically, and, preferably, the butadiene/styrene copolymers used in this invention are linear, so that each molecule contains one butadiene portion and two polystyrene portions. In general, the molecular weight of this block polymer is at least about 10,000, although preferably molecular weights range from about 50,000 to 200,000 with the respective proportions of butadiene and styrene being about as just described for each molecule. It will, of course, be appreciated that the butadiene/styrene polymer used to produce a given laminate of the invention is so chosen that when in a laminate of the invention, the laminate has a transparency, impact resistance, and thermoformability, all as described above. To prepare polybutadiene/styrene block copolymer sheets, conventional heat extrusion can be used in which the temperature ranges from about 140–180° C. with pressures ranging from about 650 to 1050 psig. The preparation of butadiene/styrene block copolymer, and the preparation of such copolymer into sheet, is well known technology to those of ordinary skill in the art and does not form a part of the present invention.

In general, the thickness of the butadiene/styrene block copolymer sheeting employed in the present invention can range typically from about 2 to 100 mils, and preferably ranges from about 5 to 40 mils.

Polystyrene sheeting suitable for use in the present invention is prepared conveniently by the extrusion of polystyrene beads or pellets. For example, suitable extrusion grade polystyrene pellets are available from the Monsanto Company under the trade designation such as HH–102. Techniques for the manufacture of polystyrene and the manufacture of polystyrene sheeting are well known to those of ordinary skill in the art and do not form a part of the present invention. Polystyrene sheeting, especially heavy gauge sheeting, can be made by molding, as those skilled in the art will appreciate. The term polystyrene as used herein has reference broadly to homopolymers derived from monovinyl aromatic compounds such as styrene; alkyl-sbustituted styrenes such as, e.g., ortho-, meta- and para-methyl styrenes, 2,4-dimethylstyrene, para-ethylstyrene, etc.; halogen-substituted styrenes such as, e.g., ortho-, meta- and para-chlorostyrenes or bromostyrenes, 2,4-dichlorostyrene; and mixed halogen-plus alkyl-substituted styrenes, such as 2-methyl-4-chlorostyrene, and the like.

Styrene/acrylonitrile copolymers are interpolymers of monovinyl aromatic compounds (as described above) with ethylenically unsaturated nitriles. The term ethylenically unsaturated nitriles includes, in addition to acrylonitrile, such monomers as methacrylonitrile and mixtures thereof with acrylonitrile. In general, the amount of acrylonitrile used in such a copolymer can typically range from greater than 0 to about 50 weight percent and preferably ranges from about 15 to 30 weight percent. Such copolymers can be made by methods well known to those skilled in the art (including extrusion and molding). For example, suitable extrusion grade polystyrene-co-acrylonitrile pellets are available from the Monsanto Company under the trade designations such as LNA–10, LNA–25, LNA–23 or the like. Such production of styrene/acrylonitrile copolymer and the formation thereof into sheets forms no part of the present invention.

In general, for use in this invention, one employs polystyrene sheets and/or poly(styrene-co-acrylonitrile) sheets typically ranging in thickness from about 3 to 200 mils, preferably from about 5 to 80 mils and more preferably from about 8 to 25 mils.

To produce a laminate of this invention, it is necessary to bond a sheet of polystyrene or a sheet of poly(styrene-co-acrylonitrile) to a sheet of block poly(butadiene-co-styrene). Such a bonding can be accomplished in either one of two ways, or by a combination thereof. One way can be called solvent welding and involves spraying either one or both surfaces to be laminated together with an organic liquid which is at least a partial solvent for (preferably) both surfaces. Preferably, a very fine spray is used, and only sufficient solvent is sprayed on a surface or surfaces to be joined to moisten same so as to avoid any surface roughening and thus cause deterioration in light transmission characteristics of the resulting laminate. Suitable inert (as regards reactivity with sheet members) solvents for use in solvent welding in accordance with this invention include aliphatic hydrocarbons, such as hexane and the like; aromatic hydrocarbons, such as toluene, xylene, and the like; aliphatic esters of carboxylic acids; aliphatic ethers, such as methyl ethyl ethers, and the like, etc. In general, it is preferred to use solvents having boiling points below about 60° C. As soon as the solvent has been applied to at least one surface of the sheet to be joined, the surfaces are brought into contact with each other, and preferably maintained in contact with one another for a time sufficient to permit the solvent to evaporate by diffusion. Preferably, pressure can be applied to the surfaces being thus joined, and some heat can be simultaneously applied. Typical pressures range from about 0 to 20 p.s.i.; typical temperatures range from about 0 to 150° C., and typical times for application of heat and pressure to surfaces being solvent welded range from about 5 to 200 minutes, though these variables can be altered, as those skilled in the art will appreciate, without departing from the spirit and scope of this invention. In general, one uses temperatures, pressure and time conditions sufficient to bond the dissimilar sheets together so as to form the desired laminate structure of this invention.

The other technique for producing laminates of the invention is the preferred one. This technique can be termed thermal welding and involves directly bonding the two different sheets of plastic together in accordance with this invention for fusion by heat and pressure only. By this technique, the different sheets are placed together and subjected to appropriate heat and pressure for a time sufficient to soften the respective interfacial surfaces and bond them together. Typical appropriate conditions for thermal welding involve the use of pressures of from about 5 to 100 p.s.i.; temperatures of from about 100 to 200° C. and times for simultaneous application of heat and pressure of from about ½ to 200 minutes, though these variables can be altered, as those skilled in the art will appreciate without departing from the spirit and scope of this invention. In general, one uses temperature, pressure and time conditions sufficient to bond the dissimilar sheets together so as to form the desired laminate structure.

It will be appreciated by those skilled in the art that the laminates of this invention can, in addition to being prepared in sheet form, be prepared in the form of tubes. Laminates of this invention can also be thermoformed into an indefinitely large variety of shaped articles of manufacture.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

The following Examples A, B, and C illustrate methods for the production of plastic sheet materials suitable for use in forming laminates of the present invention. The thickness of individual sheets are as given in the numbered examples below.

*Example A*.—A sheet of polystyrene is prepared from polystyrene pellets available from the Monsanto Company as HH–102 by heat extrusion. For extrusion, a suitable barrel temperature is about 205° C. using a die temperature of about 205° C. The roll temperature is preferably about 75° C.

*Example B*.—A sheet of styrene/acrylonitrile polymer is prepared from styrene/acrylonitrile pellets available from the Monsanto Company as LNA–20 by heat extrusion. For extrusion, a suitable barrel temperature is about 225° C. using a die temperature of about 225° C. The roll temperature is preferably about 85° C.

*Example C*.—A sheet of butadiene/styrene is prepared from butadiene/styrene pellets available from the Shell Development Company under the trade designation Thermolastic 125 by heat extrusion. For extrusion, a suitable barrel temperature is about 140–175° C. using a die temperature of about 140–175° C. The roll temperature is preferably about 60° C.

Using the above-indicated sheet materials of Examples A, B, and C, laminates of the invention are prepared as follows:

Examples 1 through 5

Samples cut from polymer sheets prepared as above indicated, are placed in face-to-face contact with one another and thermally welded together to form laminates of the invention. Thermal lamination conditions involve the use of a maximum temperature of about 150° C. achieved by raising the temperature 5° C. per minute until 150° C. is achieved while maintaining 10 p.s.i. pressure for a time of about 10 minutes. The press is cooled to at least 90° C. before the pressure is released. Details concerning individual samples so produced are summarized below in Table 1.

Examples 6 and 7

In the same manner as in Examples 1 through 5, like samples are solvent welded together by wetting both surfaces to be bonded together using a spray of toluene sufficient to moisten each surface. The solvent welding conditions used are about 25° C. at 10 p.s.i. over a total time interval of about 2 hours. The results are summarized below in Table 1.

TABLE 1

| Ex. No. | Polystyrene Sheet [1] | | Styrene/acrylonitrile Sheet [2] | | Butadiene/styrene Sheet [3] | | Bonding | | | | | Laminate, configuration of Fig. No.— |
|---|---|---|---|---|---|---|---|---|---|---|---|---|
| | Thickness in mils | No. sheets | Thickness in mils | No. sheets | Thickness in mils | No. sheets | Method solvent weld or thermal fuse | Solvent (if used) | Pressure, p.s.i. | Temp., °C. | Time (Min.) | |
| 1 | 10 | 2 | | | 10 | 1 | Thermal welded | | 10 | 150 | 10 | 2 |
| 2 | | | 20 | 2 | 20 | 1 | do | | 10 | 150 | 10 | 2 |
| 3 | | | 13 | 2 | 10 | 1 | do | | 10 | 150 | 10 | 2 |
| 4 | | | 20 | 1 | 20 | 1 | do | | 10 | 150 | 10 | 1 |
| 5 | | | 13 | 3 | 10 | 2 | do | | 15 | 175 | 10 | 3 |
| 6 | | | 13 | 2 | 10 | 1 | Solvent welded | Toluene | 10 | 25 | 120 | 2 |
| 7 | 20 | 2 | | | 20 | 1 | do | do | 10 | 25 | 120 | 2 |

[1] All polystyrene sheets prepared according to the method of Example A.
[2] All styrene/acrylonitrile sheets prepared according to the method of Example B.
[3] All butadiene/styrene sheets prepared according to the method of Example C.

Examples 8 and 9

To demonstrate impact performance and thermoformability of a laminate construction of the invention, a sample of the product of Example 2 and a sample of the product of Example 1 are each subjected to tests showing impact resistance properties (using a so-called falling dart) and showing thermoformability conditions. The test conditions and results are shown in Table 2 below.

TABLE 2

| Ex. No. | Composition Source | Composition Type | Thickness (mils) | Impact Penetration Energy (ft.-lbs.) | Impact Improvement Factor (Laminate Energy/Control/Energy) | Comments | Ease | Temp., °C. | Pressure (p.s.i.) | Time (min.) |
|---|---|---|---|---|---|---|---|---|---|---|
| | Monsanto LNA-10. | SAN Sheet | 60 | 0.20 | | Flying pieces of SAN after impact. | Exc | 175 | 30 | 2 |
| 8 | Table 1, Ex. 2 | SAN/SBS/SAN Laminate. | 20/20/20 | 1.00 | | Negligible flying pieces of SAN after impact. | Exc | 200 | 30 | 2 |
| | Monsanto HH-102. | PS Sheet | 30 | 0.10 | | Flying pieces of PS after impact. | Exc | 150 | 15 | 1.5 |
| 9 | Table 1, Ex. 1 | PS/SBS/PS Laminate. | 10/10/10 | 0.50 | | Negligible flying pieces of PS after impact. | Exc | 175 | 15 | 1.5 |

[1] The falling dart test is similar to that described in ASTM procedure D-1709-62T. In general, a 6 inch long hemispherically tapped steel cylinder with a ⅜ inch diameter nose and capable of being loaded to various weights was dropped from a fixed height of one foot. The laminate specimen to be tested was clamped in a holder so that a 2 inch diameter circular section was exposed. Increasing weights were added to the dart until impact produced consistent penetration.

What is claimed is:

1. An organic, transparent, shatter-resistant, thermoformable laminate comprising:
   (a) at least one sheet of a first transparent sheet composed of a polymer selected from the class consisting of styrene polymers and styrene/acrylonitrile polymers,
   (b) at least one sheet of a second transparent sheet composed of block copolymers of butadiene and styrene each molecule of which has polystyrene end portions and a polybutadiene middle portion,
   (c) said first sheets and said second sheets being positioned together adjacently in alternate face-to-face relationship one to another so that each interface between two such adjacent sheets is formed by a first sheet and a second sheet, and
   (d) each of said first sheets being directly and continuously bonded to each of said second sheets at this interface therebetween.

2. The laminate of claim 1 wherein each of said first sheets ranges in thickness from about 5 to 80 mils.

3. The laminate of claim 1 wherein each of said second sheets ranges in thickness from about 2 to 100 mils.

4. The laminate of claim 1 wherein a first sheet is bonded to a second sheet by means of solvent welding.

5. The laminate of claim 1 wherein a first sheet is bonded to a second sheet by means of thermal welding.

6. The laminate of claim 1 wherein all first sheets are polystyrene.

7. The laminate of claim 1 wherein all first sheets are copolymers of styrene and acrylonitrile.

8. The laminate of claim 1 wherein there are two first sheets and one second sheet.

References Cited

UNITED STATES PATENTS 3,242,038   3/1966   Dailas et al. _____ 161—253

ROBERT F. BURNETT, *Primary Examiner.*

WILLIAM J. VAN BALEN, *Assistant Examiner.*

U.S. Cl. X.R.

161—253, 254